United States Patent
Li et al.

(10) Patent No.: US 11,892,301 B2
(45) Date of Patent: Feb. 6, 2024

(54) MAP UPDATE CONTROL METHOD AND MAP UPDATE CONTROL SYSTEM FOR VISION ROBOT

(71) Applicant: AMICRO SEMICONDUCTOR CO., LTD., Guangdong (CN)

(72) Inventors: Ming Li, Guangdong (CN); Qinwei Lai, Guangdong (CN)

(73) Assignee: AMICRO SEMICONDUCTOR CO., LTD., Guangdong (CN)

( * ) Notice: Subject to any disclaimer, the term of this patent is extended or adjusted under 35 U.S.C. 154(b) by 227 days.

(21) Appl. No.: 17/600,127

(22) PCT Filed: Nov. 9, 2019

(86) PCT No.: PCT/CN2019/116911
§ 371 (c)(1),
(2) Date: Sep. 30, 2021

(87) PCT Pub. No.: WO2020/207006
PCT Pub. Date: Oct. 15, 2020

(65) Prior Publication Data
US 2022/0170750 A1      Jun. 2, 2022

(30) Foreign Application Priority Data
Apr. 12, 2019    (CN) .......................... 201910293086.4

(51) Int. Cl.
| | | |
|---|---|---|
| *G01C 21/32* | (2006.01) | |
| *G06V 10/74* | (2022.01) | |
| *G06V 20/58* | (2022.01) | |

(52) U.S. Cl.
CPC ............. *G01C 21/32* (2013.01); *G06V 10/74* (2022.01); *G06V 20/582* (2022.01)

(58) Field of Classification Search
CPC .... G01C 21/20; G01C 21/32; G01C 21/3826; G06V 10/74; G06V 20/582
See application file for complete search history.

(56) References Cited

U.S. PATENT DOCUMENTS

| | | | |
|---|---|---|---|
| 10,663,303 B2 * | 5/2020 | Lawrenson | ........... H04L 9/3247 |
| 10,969,237 B1 * | 4/2021 | Zhang | ..................... G06F 18/24 |

(Continued)

FOREIGN PATENT DOCUMENTS

| | | |
|---|---|---|
| CN | 103247225 A | 8/2013 |
| CN | 106092086 A | 11/2016 |

(Continued)

OTHER PUBLICATIONS

Li,Yongfeng et al., An Improved Loop Closure Detection Algorithm Based on Historical Model Set, ROBOT, Nov. 30, 2015, p. 663-p. 673, DOI: 10.13973/j.cnki.robot.2015.0663.

(Continued)

*Primary Examiner* — Tyler J Lee
(74) *Attorney, Agent, or Firm* — Gang Yu

(57) ABSTRACT

A map update control method and a map update control system for a vision robot are disclosed. The map update control method includes the following steps: S1, measured data of the map attributes is acquired; S2, when it is detected that the vision robot completes a traversal of the preset working region, whether the current map and a prestored historical map meet a preset matching degree is judged according to the map attribute measured data, in a case that the current map and the prestored historical map meet the preset matching degree, it is determined to store the current map; and S3, when it is determined to store information of the map attributes corresponding to the current map, the information of the map attributes corresponding to the current map is written in a map storage medium, to update (Continued)

information of the map attributes corresponding to the historical map.

8 Claims, 1 Drawing Sheet

(56) References Cited

U.S. PATENT DOCUMENTS

| | | | | |
|---|---|---|---|---|
| 2010/0082238 | A1* | 4/2010 | Nakamura | G01C 21/32 |
| | | | | 701/532 |
| 2014/0129027 | A1* | 5/2014 | Schnittman | G05D 1/0242 |
| | | | | 700/253 |
| 2018/0275677 | A1* | 9/2018 | Hamada | G05D 1/0246 |
| 2018/0356236 | A1 | 12/2018 | Lawrenson et al. | |
| 2019/0271549 | A1* | 9/2019 | Zhang | G05D 1/0246 |
| 2020/0226150 | A1* | 7/2020 | Shirani-Mehr | G01C 21/3859 |

FOREIGN PATENT DOCUMENTS

| | | |
|---|---|---|
| CN | 107796397 A | 3/2018 |
| CN | 107917712 A | 4/2018 |
| CN | 108931977 A | 12/2018 |
| CN | 109145173 A | 1/2019 |
| CN | 109507995 A | 3/2019 |
| CN | 109974722 A | 7/2019 |
| JP | 2007219645 A | 8/2007 |
| WO | 2019049657 A1 | 3/2019 |

OTHER PUBLICATIONS

Hyunhack Cho, et al., Indoor SLAM application using geometric and ICP matching methods based on line features, Robotics and Autonomous Systems, Feb. 8, 2018, p. 206-p. 224, DOI: 10.1016/j.robot.2017.11.011.

* cited by examiner

MAP UPDATE CONTROL METHOD AND MAP UPDATE CONTROL SYSTEM FOR VISION ROBOT

CROSS-REFERENCE TO RELATED APPLICATION

The present disclosure claims priority of Chinese Patent Application No. 201910293086.4, filed to China National Intellectual Property Administration on 12 Apr. 2019 and entitled "Map Update Control Method and Map Update Control System for Vision Robot", the disclosure of which is incorporated herein by reference in its entirety.

TECHNICAL FIELD

The disclosure belongs to the technical field of intelligent control, and particularly relates to a map update control method and a map update control system for a vision robot.

BACKGROUND

Current mobile robots on the market always delete historical maps first and then start to build a map each time. This is also characteristic of a slam algorithm. The full name of the slam algorithm is Simultaneous Localization and Mapping. When a traversal is performed in a same working region, a robot frequently reconstructs a map, but after a new map is built, an original map is not stored, so that information recorded in the original map is invalid. A historical map mentioned in this specification is equivalent to the above original map.

Thus, when repeatedly navigating the same working region, the robot does not make full use of map information of the historical map, instead, it performs navigation and positioning based on map information of the newly built map, after deleting the historical map. Then, for a scene where an environment the robot locates in the same working region does not change, it is not significant to reconstruct a map or update the historical map, instead, computation amount of the robot is increased, thereby reducing a work efficiency of the robot, and making users feel that the robot has poor learning ability to surrounding environment. Therefore, how to utilize the historical map to increase a degree of familiarity of the robot with a preset working region, and how to improve the learning ability of the robot to the preset working region are technical defects to be perfected in the conventional art.

SUMMARY

A map update control method for a vision robot is disclosed. The map update control method controls the vision robot to acquire an image of a road sign set in a preset working region in real time, and comprises the following steps: S1, the vision robot is controlled to traverse the preset working region and acquire measured data of map attributes corresponding to a current map of a preset working region; S2, when it is detected that the vision robot completes a traversal of the preset working region, whether the current map and a prestored historical map meet a preset matching degree is judged according to the measured data of the map attributes, in a case that the current map and the prestored historical map meet the preset matching degree, it is determined to store the current map, otherwise, it is determined not to store the current map but to keep the prestored historical map; and S3, when it is determined to store information of the map attributes corresponding to the current map, the information of the map attributes corresponding to the current map is written in a map storage medium, to update information of the map attributes corresponding to the historical map; wherein the map storage medium is a storage unit within a system of the vision robot.

Optionally, the S2 comprises: S201, according to the measured data of the map attributes, whether the actual region area corresponding to the current map is greater than an actual region area corresponding to the historical map by a preset area threshold is judged, in a case that the actual region area corresponding to the current map is greater than the actual region area corresponding to the historical map by the preset area threshold, S204 is entered, otherwise, S202 is entered; S202, according to the measured data of the map attributes, whether the number of road signs corresponding to the current map is greater than the number of road signals corresponding to the historical map by a preset number threshold is judged, in a case that the number of road signs corresponding to the current map is greater than the number of road signals corresponding to the historical map by the preset number threshold, S204 is entered, otherwise, S203 is entered; S203, according to the measured data of the map attributes, whether storage time of the historical map is greater than a preset time threshold is judged, in a case that the storage time of the historical map is greater than the preset time threshold, S204 is entered, otherwise, it is determined not to write the current map in the map storage medium but to keep the historical map; and S204, it is determined to store the current map to update the historical map; wherein, judgment standards of the preset matching degree comprise difference quantity of actual region areas corresponding to maps, difference quantity of numbers of road signs corresponding to maps, and difference quantity of storage time of maps; the measured data of the map attributes is obtained by performing computation on an image of a road sign in a case that the vision robot traverses the preset working region; and the measured data of the map attributes is converted to obtain an actual region area corresponding to a map, a number of road signs corresponding to a map, and storage time of a map.

Optionally, before S2, the method further comprises: when it is detected that the vision robot completes the traversal of the preset working region, whether the historical map exists in the map storage medium is judged according to a map identifier, in a case that the historical map exists in the map storage medium, S2 is entered, otherwise, whether to store the information of the map attributes corresponding to the current map is determined directly according to the number of road signs currently recorded by the vision robot; wherein the information of the map attributes comprises the map identifier and the number of road signs that are used for identifying the map data of the map storage medium.

Optionally, whether to store the information of the map attributes corresponding to the current map is determined directly according to the number of road signs currently recorded by the vision robot comprises: whether the number of road signs currently recorded by the vision robot is greater than a preset threshold is judged according to the measured data of the map attributes, in a case that the number of road signs currently recorded by the vision robot is greater than the preset threshold, it is determined to store the current map, otherwise, it is determined not to store the current map.

Optionally, in S3, when it is determined to store the information of the map attributes corresponding to the current map, the vision robot is first controlled to stop moving, and the information of the map attributes corresponding to the current map is written in the map storage medium.

A map update control system for a vision robot is disclosed. The map update control system used for controlling the vision robot to acquire an image of a preset road sign in a preset working region in real time comprises the following modules: an acquisition module is configured to acquire measured data of map attributes corresponding to a current map of the preset working region; a map matching module is configured to judge whether the current map and a prestored historical map meet a preset matching degree according to the measured data of the map attributes in a case that it is detected that the vision robot completes a traversal of the preset working region, in a case that the current map and the prestored historical map meet the preset matching degree, determine to store the current map, otherwise, determine not to store the current map but to keep the prestored historical map; and a map storage module is configured to write information of the map attributes corresponding to the current map in a map storage medium to update information of the map attributes corresponding to the historical map in a case that it is determined to store the information of the map attributes corresponding to the current map; wherein the map storage medium is a storage unit within a system of the vision robot.

Optionally, an area matching judgment submodule is configured to judge whether an actual region area corresponding to the current map is greater than an actual region area corresponding to the historical map by a preset area threshold according to the measured data of the map attributes, in a case that the actual region area corresponding to the current map is greater than the actual region area corresponding to the historical map by the preset area threshold, transmit a judgment result signal to a storage decision-making submodule, otherwise, transmit the judgment result signal to the road sign matching judgment submodule. A road sign matching submodule is configured to judge whether the number of road signs corresponding to the current map is greater than the number of road signals corresponding to the historical map by a preset number threshold according to the measured data of the map attributes, in a case that the number of road signs corresponding to the current map is greater than the number of road signals corresponding to the historical map by the preset number threshold, transmit a judgment result signal to the storage decision-making submodule, otherwise, transmit the judgment result signal to the time matching judgment submodule. A time matching judgment submodule is configured to judge whether storage time of the historical map is greater than a preset time threshold according to the measured data of map attributes, in a case that the storage time of the historical map is greater than the preset time threshold, transmit a judgment result signal to the storage decision-making submodule, otherwise, determine not to store the current map. The storage decision-making submodule is configured to store the current map and send a storage decision-making signal to the map storage module; wherein judgment standards of the preset matching degree comprise difference quantity of actual region areas corresponding to maps, difference quantity of numbers of road signs corresponding to maps, and difference quantity of storage time of maps; and the measured data of the map attributes is obtained by performing computation on an image of a road sign in a case that the vision robot traverses the preset working region; and the measured data of the map attributes is converted to obtain an actual region area corresponding to a map, a number of road signs corresponding to a map, and storage time of a map.

Optionally, the map matching module is further configured to judge whether the historical map exists in the map storage medium according to a map identifier in a case that it is detected that the vision robot completes a traversal of the preset working region, in a case that the historical map exists in the map storage medium, transmit a judgment result to the area matching judgment submodule, otherwise, determine whether to store the information of the map attributes directly corresponding to the current map according to the number of road signs currently recorded by the vision robot; wherein the information of the map attributes comprises a map identifier used for marking map data of the map storage medium, the number of road signs, a two-dimensional grid map, information of the road signs used for performing vision positioning, pose information of the road signs output by transforming the information of the road signs, and a check value of foregoing data.

Optionally, directly determining whether to store map attribute information corresponding to the current map directly according to the number of road signs currently recorded by the vision robot comprises: the map matching module is configured to judge whether the number of road signs currently recorded by the vision robot is greater than a preset threshold according to the measured data of the map attributes, in a case that the number of road signs currently recorded by the vision robot is greater than the preset threshold, send a judgment result signal to the map storage module, otherwise, determine not to store the current map; wherein the preset threshold refers to the number of road signs representing the integrity degree of characteristics of the preset working region. Therefore, enough characteristic information of road signs on the current map is ensured, so that the map stored later can save the complete road sign information in the preset working region.

Optionally, the map storage module is further configured to control the vision robot to stop moving firstly and then write the information of the map attributes corresponding to the current map in the map storage medium when it is determined to store the information of map attributes corresponding to the current map.

DETAILED DESCRIPTION OF THE EMBODIMENTS

Figure 1:
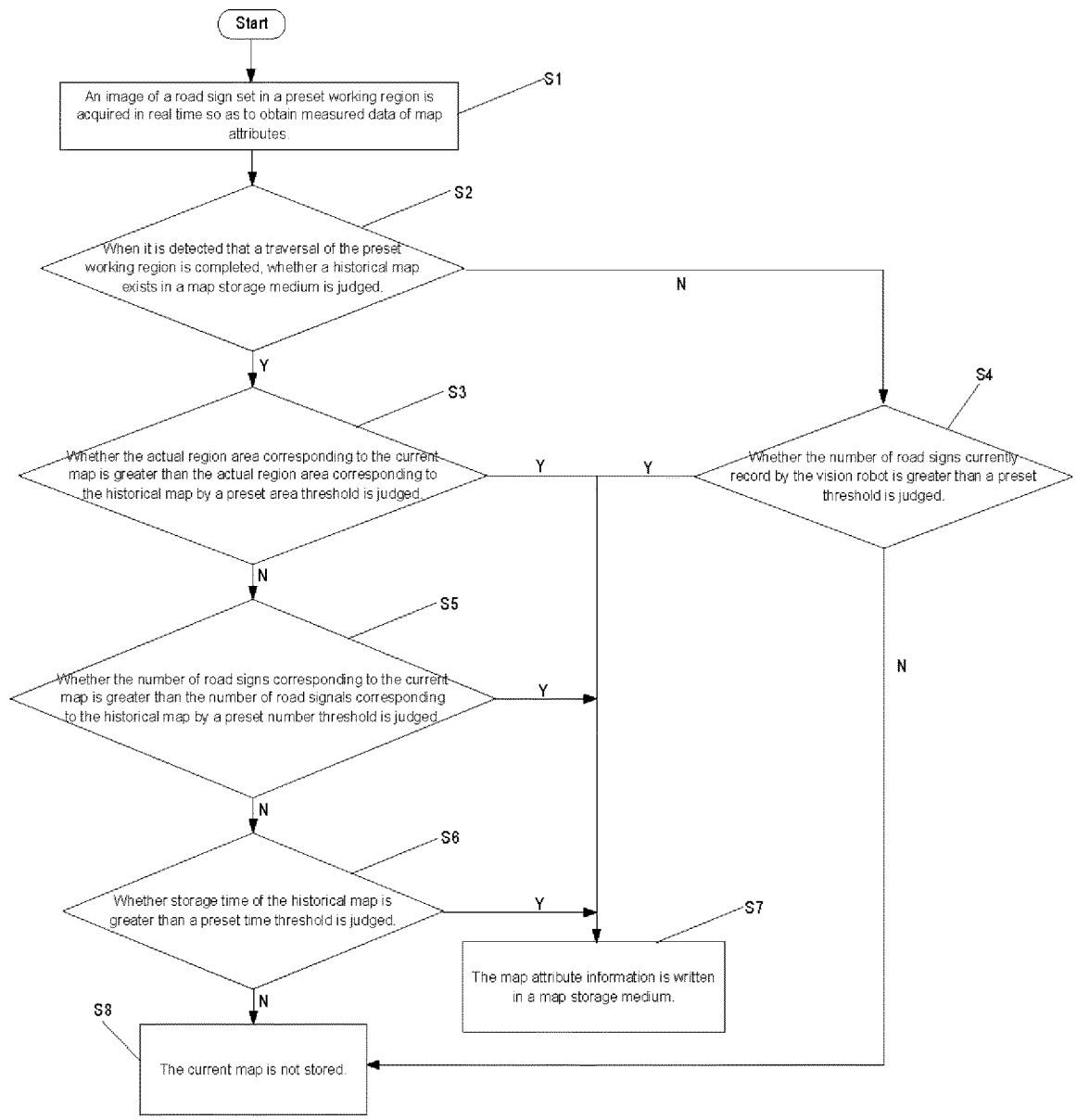
FIG. 1 is a flowchart of a map update control method for a vision robot according to an embodiment of the disclosure.

The technical solution in the embodiment of the disclosure will be described below in detail with reference to the accompanying drawings in the embodiment of the disclosure.

Embodiments of the disclosure provide a map update control method for a vision robot. The map update control method is used for controlling the vision robot to acquire an image of a road sign set in a preset working region in real time, wherein information of the image of the road sign includes characteristic points of the image of the road sign, which are mainly acquired by an image acquisition sensor mounted on a body of the vision robot. After the information is processed, actual distance information of the road sign and the vision robot may be obtained. It is to be noted that the road sign is used for describing a manually set marker in an environment. The map update control method includes the following steps:

in S1, the vision robot is controlled to traverse the preset working region to acquire measured data of map attributes corresponding to a current map of a preset working region. In the embodiment of the disclosure, the vision robot may be a sweeping robot with a camera, the preset working region is a to-be-swept area in the same room, and during each complete sweeping process, the vision robot may complete building of the current map according to the SLAM algorithm;

in S2, when it is detected that the vision robot completes a traversal of the preset working region, whether the current map and a prestored historical map meet a preset matching degree is judged according to the measured data of the map attributes, in a case that the current map and the prestored historical map meet the preset matching degree, it is determined to store the current map to update the historical map, otherwise, it is determined not to store the current map but only keep the prestored historical map. Here, the vision robot has completed a sweeping in the to-be-swept area in the same room rather than triggering an operation of map storage during sweeping or after sweeping is artificially interrupted, thereby ensuring that the currently built map is the most complete map. The step is used to decide whether to trigger the storage of the current map to update the historical map;

in S3, when the current map is determined to be stored according to the decision information in S2, that is, when the corresponding information of the map attributes is written in the map storage medium, the vision robot is controlled to stop moving, and then the information of the map attributes corresponding to the current map is written in the map storage medium to update information of the map attributes corresponding to the historical map, but storage space of the historical map in the map storage medium is required to be cleared. In this step, the vision robot starts to store the current map in flash in a non-motion mode. The map storage medium in the embodiment is the flash. Preferably, the robot is prohibited from starting and cannot perform the action of clearing the map in the process of executing this step. The information of the map attributes includes a map identifier used for marking map data of the map storage medium, the number of road signs, a two-dimensional grid map, information of the road signs used for performing vision positioning, pose information of the road signs output by transforming the information of the road signs, and a check value of foregoing data. The map storage medium is a storage unit within the system of the vision robot and is specially configured to store the map data, in particular, the information of the map attributes, generated by the vision robot during a SLAM process.

According to the embodiment of the disclosure, with reference to the measured data of the map attributes currently acquired, a matching degree between the current map and the historical map is judged, so that a change of an environment of the preset working region where the vision robot locates in is detected, the historical map may be selectively kept based on this change, especially when the environment does not change, the historical map of the robot may be kept. Compared with the conventional art, there is no need to update map data when a traversal in the preset working region is restarted, reducing the computation amount of software resources of the robot, and indicating that a degree of familiarity of the vision robot with the working region is improved, thereby improving the learning ability of the robot to the preset working region.

After the vision robot starts sweeping work in the preset working region, it enters S1 to start executing the map update control method. It is to be noted that the vision robot may not be the first time to sweep in the preset working region. In the embodiment of the disclosure, the map update control method is based on the SLAM algorithm. The vision robot pre-constructs the historical map and stores the historical map corresponding to the preset working region in the map storage medium, and there is no need to update the map data every time the work is restarted.

As an embodiment, as shown in FIG. 1, the map update control method provided in the embodiment of the disclosure specifically includes the following steps:

in S1, the vision robot is controlled to acquire an image of a road sign set in a preset working region in real time, and acquire corresponding measured data of the map attributes during building of a current map, and then S2 is entered;

in S2, whenever it is detected that the vision robot completes a traversal of the preset working region, whether the historical map exists in the map storage medium according to a map identifier is judged, in a case that the historical map exists in the map storage medium according to the map identifier, S3 is entered, otherwise, S4 is entered. The map identifier is a uniquely identifiable identifier of the map data in the map storage medium. In the embodiment, the vision robot completes a traversal of the preset working region, which represents the end of a complete sweeping task, and then whether to trigger a map storage event is decided in the system of the robot;

in S3, according to the measured data of the map attributes, whether the actual region area corresponding to the current map is greater than an actual region area corresponding to the historical map by a preset area threshold is judged, in a case that the actual region area corresponding to the current map is greater than the actual region area corresponding to the historical map by the preset area threshold, S7 is entered, otherwise, S5 is entered; wherein the actual region area corresponding to the map is used to measure the integrity of covering of the preset working region when the vision robot traverses the preset working region, and the preset area threshold is used as an area margin to indicate that the current map and the historical map can be considered similar within a certain difference area. The greater the preset area threshold value, the larger the difference area between the current map and the historical map, and the lower the similarity between the current map and the historical map. Since a certain repeated traversal of local working region is allowed when the vision robot builds the historical map, or a traverse blind area may be present, when the actual region area corresponding to the current map does not exceed the actual region area corresponding to the historical map, it can be considered that the current map built by the vision robot and the historical map meet the preset matching degree;

in S4, whether the number of road signs currently recorded by the vision robot is greater than a preset threshold is judged according to the measured data of the map attributes, in a case that the number of road signs currently recorded by the vision robot is greater than a preset threshold, S7 is entered, it is determined to store the current map in the map storage medium to update the historical map, otherwise, S8 is entered. The preset threshold is the number of road signs used to represent the integrity of the characteristics of the preset working region. When the historical map does not exist in the map storage medium, a new map is built directly according to the number of road signs currently recorded by the vision robot and stored in the map storage medium. Enough characteristic information of the road signs on the current map is ensured by setting the preset threshold, so that the map stored later can save the complete information of the road signs in the preset working region, thereby improving the integrity of the built map. According to the embodiment of the disclosure, on the premise that no map exists in the map storage medium, a method for building a new map is provided, to assist the vision robot to complete a traversal within the preset working region;

in S5, according to the measured data of the map attributes, whether the number of road signs corresponding to the current map is greater than the number of road signals corresponding to the historical map by a preset number threshold is judged, in a case that the number of road signs corresponding to the current map is greater than the number of road signals corresponding to the historical map by the preset number threshold, S7 is entered, otherwise, S6 is entered; wherein the number of road signs is used to measure the comprehensiveness of the road signs acquired when the vision robot traverses the preset working region. The preset number threshold is used as a quantity margin to indicate that the number of road signs corresponding to the current map and the number of road signs corresponding to the historical map can be considered similar within a certain number difference range of the road signs. If the actual region area corresponding to the current map is less than or equal to the actual region area corresponding to the historical map, it indicates that the current map and the historical map meet the preset matching degree on a two-dimensional plane area, so that it is necessary to further determine the matching degree between the current map built by the vision robot and the road sign characteristics of the historical map by comparing whether the number of road signs corresponding to the current map is greater than the number of road signs corresponding to the historical map, because an integrity of the spatial location characteristic of the preset working region can be represented with enough visual road sign information. Further, if the number of road signs acquired in the process of building the current map does not exceed the preset number threshold of the number of road signs acquired in the process of building the historical map, it is sufficient to determine that the current map and the history map built by the vision robot satisfy the preset matching degree;

in S6, according to the measured data of the map attributes, whether storage time of the historical map is greater than a preset time threshold is judged, in a case that the storage time of the historical map is greater than the preset time threshold, S7 is entered, otherwise, S8 is entered; wherein the preset time threshold is used to measure a threshold for refreshing the map when the vision robot finishes traversing the preset working region. The foregoing steps S3 and S5 are both used for judging a spatial matching degree of the environment detected by the vision robot. When S6 is entered, it means that the current map built by the vision robot and the historical map do not meet the spatial matching degree, and the current map built by the vision robot cannot completely represent the location characteristics of the road signs of the preset working region. When the environment where the vision robot locates changes greatly, for example, furnishings in the environment of the same preset working region are moved greatly, and the current map is buffered in the memory for a limited time, it means that there is a certain refresh time. If storage time of an original map is too long, the current map to be stored will be invalid. At this time, the historical map is still used for positioning, which is easy to cause new acquired information of the road signs and the current position information of the body to be lost. Therefore, a preset time threshold is set as a threshold time for buffer temporary storage of the map. When the time that the historical map is stored in the map storage medium exceeds the preset time threshold, the current map is required to update the historical map, regardless of the matching degree between the historical map and the current map, after all, the vision robot will expand the current map to represent a complete working region in the subsequent process of traversing the same preset working region;

in S7, the vision robot is first controlled to stop moving and in a non-motion mode, the vision robot starts to write the current map in the map storage medium. It is to be noted that during map storage, the robot is prohibited from starting and cannot perform the action of clearing the map, thereby preventing the region area corresponding to the stored map data being less than the actually traversed region area, and further ensuring the integrity of the updated and stored map. Then, the corresponding storage space of the historical map in the map storage medium is deleted, and the information of the map attributes corresponding to the current map is written from buffer memory into the map storage medium, thereby achieving the purpose of storing the current map and realizing updating and replacing the historical map with the current map. During a new traversal of the preset working region, the current map will become the historical map in the map storage medium, so that subsequent update of the historical map will only be performed on the premise that the preset matching degree is not satisfied;

in S8, it is determined not to write the current map into the map storage medium but to keep the historical map, thereby avoiding updating the map data by building a new map every time the work is restarted. Here, the vision robot is more familiar with the preset working region.

In the foregoing embodiment, the measured data of the map attributes refers to a signal obtained by performing statistical processing on the road signs when the vision robot traverses the preset working region. Enough characteristic information of the road signs on the current map is ensured, so that the map stored later can save the complete information of the road signs in the preset working region. The measured data of the map attributes is converted to obtain the actual region area corresponding to the map, the number of road signs corresponding to the map, and the storage time of the map. Standards for measurement of the preset matching degree include the difference quantity of the actual region areas corresponding to the maps, the difference quantity of the numbers of road signs corresponding to the maps, and the difference quantity of the storage time of the maps, and is obtained by conversion of the measured data of the map attributes. The matching degree between the current map and the historical map is based on the conversion of the measured data of the map attributes, including comparison results of the actual region areas corresponding to the maps, the number of road signs, and the storage time. A series of thresholds are adopted for a multi-level comparative evaluation of the matching degree or similarity between the current map and the historical map, thereby improving the judgment precision of the map matching degree, and further increasing the accuracy and integrity of the map stored in the map storage medium.

Preferably, the current map is buffered into preset memory in real time after the vision robot starts to work in the same preset working region. The historical map refers to map data stored in the map storage medium, and is updated and replaced with the current map when it is judged that the current map and the historical map cannot meet the preset matching degree; wherein the preset memory is different from the map storage medium. Data of the current map is always buffered in the memory during the process of building the map, and the historical map in the map storage medium may be updated and replaced only when it is judged that the historical map and the current map in the memory do not meet the preset matching degree. Generally, the data of the historical map is kept in the map storage medium, and there is no need to update the map data every time the preset working region is re-traversed, thereby improving the familiarity of the vision robot with the environment and the map learning ability.

Figure 2:
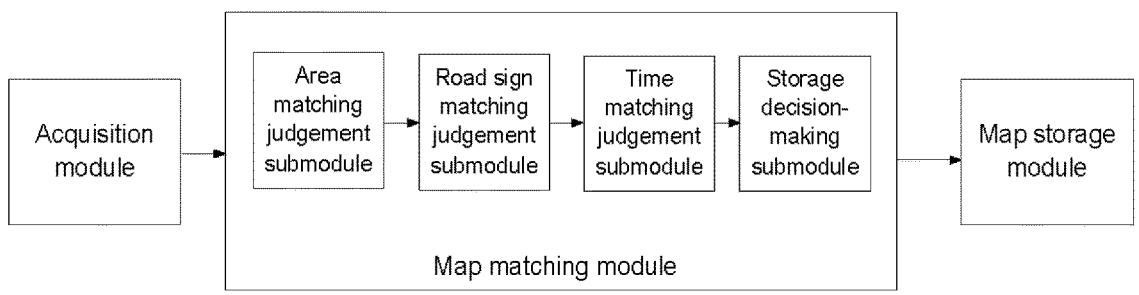
FIG. 2 is a block diagram of a map storage system of a vision robot according to an embodiment of the disclosure.

Based on the foregoing inventive concept, the embodiments of the disclosure also provide a map update control system for a SLAM vision robot. Specific working principles of each module included in the map update control system are disclosed in the foregoing embodiments, which will not be elaborated in the embodiments of the disclosure. As shown in FIG. 2, the map update control system includes an acquisition module, a map matching module, and a map storage module. The acquisition module is configured to control the vision robot to move in the preset working region, acquire an image of a road sign set in the preset working region in real time, and then acquire corresponding measured data of map attributes in the process of building a current map.

The map matching module is configured to judge whether the current map and a prestored historical map meet a preset matching degree according to measured data of the map attributes when it is detected that the vision robot completes a traversal of the preset working region, in a case that the current map and the prestored historical map meet the preset matching degree, determine to store the current map, otherwise, determine not to store the current map but to keep the prestored historical map. Specific processes include that: whether the historical map exists in the map storage medium is detected according to a map identifier, in a case that the historical map exists in the map storage medium, a matching degree of the current map and the historical map is analyzed according to the measured data of the map attributes, and then whether to store information of the map attributes corresponding to the current map is determined; otherwise, whether to store the information of the map attributes corresponding to the current map is determined directly according to the number of road signs currently recorded by the vision robot, where the number of road signs may be obtained by converting the measured data of the map attributes.

The map storage module is configured to, when the map matching module determines to store the information of the map attributes corresponding to the current map, first control the vision robot to stop moving, and then write the information of the map attributes corresponding to the current map in a map storage medium, to update information of the map attributes corresponding to the historical map. It is to be noted that during map storage, the robot is prohibited from starting and cannot perform the action of clearing the map, thereby preventing the region area corresponding to the stored map data being less than the actually traversed region area, and further ensuring the integrity of the updated and stored map. The information of the map attributes includes a map identifier used for marking map data of the map storage medium, the number of road signs, information of the road signs used for performing vision positioning, and pose information of the road signs output by transforming the information of the road signs, which is obtained by calculation based on the measured data of the map attributes. The measured data of the map attributes is obtained by performing computation on the image of the road sign when the vision robot traverses the preset working region; and the historical map is a pre-constructed and stored environmental map of the preset working region.

In the embodiment of disclosure, map storage and update are performed based on keeping of the historical data, so that an effectiveness of the historical map of the robot can be kept, the integrity and precision of the current map stored by the system may be effectively improved, thereby improving the learning ability of the system. Specifically, with reference to the measured data of the map attributes currently acquired, a matching degree between the current map and the historical map is judged, so that a change of environment of the preset working region where the vision robot locates in is detected, the historical map may be selectively kept based on this change, especially when the environment does not change, the effectiveness of the historical map of the robot may be kept. Compared with the conventional art, there is no need to update map data every time the preset working region is re-traversed, indicating that the degree of familiarity of the vision robot with the working region is improved, thereby improving the learning ability of the robot to the preset working region.

Preferably, the map matching module includes: an area matching judgment submodule, configured to judge whether the actual region area corresponding to the current map is greater than the actual region area corresponding to the historical map by a preset area threshold according to the measured data of the map attributes, in a case that the actual region area corresponding to the current map is greater than the actual region area corresponding to the historical map by the preset area threshold, transmit a judgment result signal to a storage decision-making submodule, otherwise, transmit the judgment result signal to the road sign matching judgment submodule; a road sign matching submodule, configured to judge whether the number of road signs corresponding to the current map is greater than the number of road signals corresponding to the historical map by a preset number threshold according to the measured data of the map attributes, in a case that the number of road signs corresponding to the current map is greater than the number of road signals corresponding to the historical map by the preset number threshold, transmit a judgment result signal to the storage decision-making submodule, otherwise, transmit the judgment result signal to the time matching judgment submodule; a time matching judgment submodule, configured to judge whether storage time of the historical map is greater than a preset time threshold according to the measured data of map attributes, in a case that the storage time of the historical map is greater than the preset time threshold, transmit a judgment result signal to the storage decision-making submodule, otherwise, determine not to store the current map; and the storage decision-making submodule, configured to store the current map and send a storage decision-making signal to the map storage module; wherein judgment standards of the preset matching degree comprise difference quantity of actual region areas corresponding to maps, difference quantity of numbers of road signs corresponding to maps, and difference quantity of storage time of maps. The matching degree between the current map and the historical map is based on conversion of the measured data of the map attributes, including comparison results of the actual region areas corresponding to the map, the number of road signs, and the storage time. The threshold setting in the technical solution can be better applicable to evaluating the degree of matching between the current map and the historical map, which is conducive to subsequent storage of completer and more accurate information of the map, so that the relevant matching modules are better adaptable to actual environments.

Preferably, the map matching module is further configured to judge whether the historical map exists in the map storage medium according to a map identifier when it is detected that the vision robot completes a traversal of the preset working region, in a case that the historical map exists in the map storage medium, transmit a judgment result to the area matching judgment submodule, otherwise, determine whether to store information of the map attributes corresponding to the current map directly according to the number of road signs currently recorded by the vision robot, wherein the information of the map attributes includes a map identifier used for marking map data of the map storage medium, the number of road signs, a two-dimensional grid map, information of the road signs used for performing vision positioning, pose information of the road signs output by transforming the information of the road signs, and a check value of foregoing data. According to the technical solution, on the premise that no map exists in the map storage medium, a method for building a new map is provided, to assist the vision robot to complete a traversal within the preset working region.

Preferably, directly determining whether to store map attribute information corresponding to the current map directly according to the number of road signs currently recorded by the vision robot includes that: when the map matching module detects that no historical map exists in the map storage medium, whether the number of road signs currently recorded by the vision robot is greater than a preset threshold is judged according to the measured data of the map attributes, in a case that the number of road signs currently recorded by the vision robot is greater than the preset threshold, a judgment result signal is sent to the map storage module, otherwise, it is determined not to store the current map; wherein the preset threshold refers to the number of road signs representing the integrity degree of the characteristics of the preset working region. According to the technical solution, a storage strategy for an initial built map is determined by judging the number of visual road signs, thereby improving an accuracy of the map stored under a vision condition. Enough characteristic information of road signs on the current map is ensured, so that the map stored later can save the complete information of the road signs in the preset working region. According to the technical solution, the enough characteristic information of the road signs on the current map is ensured, so that the map stored later can save the complete information of the road signs in the preset working region, thereby improving the integrity of the built map.

Preferably, the acquisition module further includes a statistic analysis submodule which is configured to perform statistical processing on the image of the road signs to obtain the measured data of the map attributes when the vision robot traverses the preset working region. Enough characteristic information of road sign on the current map is ensured, so that the map stored later can save the complete information of the road signs in the preset working region.

The current map is buffered into preset memory by the map storage module in real time after the vision robot starts to work in the same preset working region. The historical map refers to map data stored in the map storage medium, and is updated and replaced with the current map under control of the map storage module when it is judged that the current map and the historical map cannot meet the preset matching degree; wherein the preset memory is different from the map storage medium. Thus, rationality and integrity in utilization of the map in the map storage medium are improved, and working efficiency is improved.

Based on the foregoing embodiments, the map update control system has a map storage function, and each time characteristics of surrounding environment are marked and stored on the corresponding map, the robot becomes more and more familiar with the surrounding environment, path planning will be more and more intelligent correspondingly, and the problem of low learning ability of the vision robot can be well solved.

Those skilled in the art should know that the embodiment of the application may be provided as a method, a system, or a computer program product. Therefore, this application may adopt forms of complete hardware embodiments, complete software embodiments or embodiments integrating software and hardware. Moreover, this application may adopt the form of a computer program product implemented on one or more computer available storage media (including but not limited to a disk memory, a Compact Disc Read Only Memory (CD-ROM), an optical memory, etc.) containing computer available program codes.

This application is described with reference to flowcharts and/or block diagrams of the method, the device (system) and the computer program product according to the embodiments of this application. It should be understood that each flow and/or block in the flowchart and/or block diagram, and the combination of the flow and/or block in the flowchart and/or block diagram can be implemented by the computer program instructions. These computer program instructions can be provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in one or more flows of the flowchart and/or one or more blocks of the block diagram.

These computer program instructions may also be stored in the computer-readable memory which can guide the computer or other programmable data processing devices to work in a particular way, so that the instructions stored in the computer-readable memory generate a product including an instruction device. The instruction device implements the specified functions in one or more flows of the flowchart and/or one or more blocks of the block diagram.

These computer program instructions may also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

Finally, it is to be noted that: the above embodiments are only intended to illustrate the technical solution of the disclosure and not to limit the same. Although the disclosure has been described in detail with reference to the preferred embodiments, those skilled in the art will appreciate that: modifications may be made to the specific embodiments of the disclosure or equivalent replacement may be performed on some of the technical features without departing from the spirit of the technical solution of the disclosure, and all those modifications and the equivalent replacement should be included within the scope of the technical solution as claimed by the disclosure.

What is claimed is:

1. A map update control method for a vision robot, the map update control method controlling the vision robot to acquire an image of a road sign set in a preset working region in real time, comprising:
    S1 acquiring measured data of map attributes corresponding to a current map of the preset working region;
    S2 in a case that it is detected that the vision robot completes a traversal of the preset working region, judging whether the current map and a prestored historical map meet a preset matching degree according to the measured data of the map attributes, in a case that the current map and the prestored historical map meet the preset matching degree, determining to store the current map, in a case that the current map and the prestored historical map do not meet the preset matching degree, determining not to store the current map but to keep the prestored historical map; and
    S3 in a case that it is determined to store information of the map attributes corresponding to the current map, writing the information of the map attributes corresponding to the current map in a map storage medium to update information of the map attributes corresponding to the historical map;
    wherein the map storage medium is a storage unit within a system of the vision robot,
    wherein the S2 comprise:
    S201 judging whether an actual region area corresponding to the current map is greater than an actual region area corresponding to the historical map by a preset area threshold according to the measured data of the map attributes, in a case that the actual region area corresponding to the current map is greater than the actual region area corresponding to the historical map by the preset area threshold, entering S204, otherwise, entering S202;
    S202 judging whether the number of road signs corresponding to the current map is greater than the number of road signals corresponding to the historical map by a preset number threshold according to the measured data of the map attributes, in a case that the number of road signs corresponding to the current map is greater than the number of road signals corresponding to the historical map by the preset number threshold, entering S204, otherwise, entering S203;
    S203 judging whether storage time of the historical map is greater than a preset time threshold according to the measured data of map attributes, in a case that the storage time of the historical map is greater than the preset time threshold, entering S204, otherwise, determining not to write the current map in the map storage medium but to keep the historical map; and
    S204 determining to store the current map to update the historical map;
    wherein judgment standards of the preset matching degree comprise difference quantity of actual region areas corresponding to maps, difference quantity of numbers of road signs corresponding to maps, and difference quantity of storage time of maps; and
    the measured data of the map attributes is obtained by performing computation on an image of a road sign in a case that the vision robot traverses the preset working region; and the measured data of the map attributes is converted to obtain an actual region area corresponding to a map, a number of road signs corresponding to a map, and storage time of a map.

2. The map update control method of claim 1, before S2, further comprising: in a case that it is detected that the vision robot completes the traversal of the preset working region, judging whether the historical map exists in the map storage medium according to a map identifier, in a case that the historical map exists in the map storage medium, entering S2, otherwise, determining whether to store the information of the map attributes corresponding to the current map directly according to the number of road signs currently recorded by the vision robot; wherein the information of the map attributes comprises the map identifier and the number of road signs that are used for identifying the map data of the map storage medium.

3. The map update control method of claim 2, wherein directly determining whether to store the information of the map attributes corresponding to the current map according to the number of road signs currently recorded by the vision robot comprises:
    judging whether the number of road signs currently recorded by the vision robot is greater than a preset threshold according to the measured data of the map attributes, in a case that the number of road signs currently recorded by the vision robot is greater than the preset threshold, determining to store the current map, otherwise, determining not to store the current map.

4. The map update control method of claim 1, wherein in S3, in a case that it is determined that the information of the map attributes corresponding to the current map is stored, the vision robot being first controlled to stop moving, and the information of the map attributes corresponding to the current map being written in the map storage medium.

5. A map update control system for a vision robot, the map update control system used for controlling the vision robot to acquire an image of a road sign set in a preset working region in real time, comprising a processor, the processor comprising:
    an acquisition module, configured to acquire measured data of map attributes corresponding to a current map of the preset working region;
    a map matching module, configured to judge whether the current map and a prestored historical map meet a preset matching degree according to the measured data of the map attributes in a case that it is detected that the vision robot completes a traversal of the preset working region, in a case that the current map and the prestored historical map meet the preset matching degree, determining to store the current map, in a case that the current map and the prestored historical map do not meet the preset matching degree, determining not to store the current map but to keep the prestored historical map; and a map storage module, configured to write information of the map attributes corresponding to the current map in a map storage medium to update information of the map attributes corresponding to the historical map in a case that it is determined to store the information of the map attributes corresponding to the current map;

wherein the map storage medium is a storage unit within a system of the vision robot, wherein the map matching module comprises an area matching judgment submodule, a road sign matching judgment submodule, a time matching judgment submodule, and a storage decision-making submodule; wherein the area matching judgment submodule is configured to judge whether an actual region area corresponding to the current map is greater than an actual region area corresponding to the historical map by a preset area threshold according to the measured data of the map attributes, in a case that the actual region area corresponding to the current map is greater than the actual region area corresponding to the historical map by the preset area threshold, transmit a judgment result signal to the storage decision-making submodule, otherwise, transmit the judgment result signal to the road skin matching judgment submodule;

the road sign matching submodule is configured to judge whether the number of road signs corresponding to the current map is greater than the number of road signals corresponding to the historical map by a preset number threshold according to the measured data of the map attributes, in a case that the number of road signs corresponding to the current map is greater than the number of road signals corresponding to the historical map by the preset number threshold, transmit a judgment result signal to the storage decision-making submodule, otherwise, transmit the judgment result signal to the time matching judgment submodule;

the time matching judgment submodule is configured to judge whether storage time of the historical map is greater than a preset time threshold according to the measured data of map attributes, in a case that the storage time of the historical map is greater than the preset time threshold, transmit a judgment result signal to the storage decision-making submodule, otherwise, determine not to store the current map; and the storage decision-making submodule is configured to store the current map and send a storage decision-making signal to the map storage module;

wherein judgment standards of the preset matching degree comprise difference quantity of actual region areas corresponding to maps, difference quantity of numbers of road signs corresponding to maps, and difference quantity of storage time of maps; and the measured data of the map attributes is obtained by performing computation on an image of a road sign in a case that the vision robot traverses the preset working region; and the measured data of the map attributes is converted to obtain an actual region area corresponding to a map, a number of road signs corresponding to a map, and storage time of a map.

6. The map update control system of claim 5, wherein the map matching module is further configured to judge whether the historical map exists in the map storage medium according to a map identifier in a case that it is detected that the vision robot completes a traversal of the preset working region, in a case that the historical map exists in the map storage medium, transmit a judgment result to the area matching judgment submodule, otherwise, determine whether to store the information of the map attributes corresponding to the current map directly according to the number of road signs currently recorded by the vision robot; wherein the information of the map attributes comprises the map identifier and the number of road signs that are used for identifying map data of the map storage medium.

7. The map update control system of claim 6, wherein directly determining whether to store the information of the map attributes corresponding to the current map according to the number of road signs currently recorded by the vision robot comprises:

the map matching module is configured to judge whether the number of road signs currently recorded by the vision robot is greater than a preset threshold according to the measured data of the map attributes, in a case that the number of road signs currently recorded by the vision robot is greater than the preset threshold, send a judgment result signal to the map storage module, otherwise, determine not to store the current map.

8. The map update control system of claim 6, wherein the map storage module is further configured to control the vision robot to stop moving firstly and then write the information of the map attributes corresponding to the current map in the map storage medium in a case that it is determined that the information of map attributes corresponding to the current map is stored.

* * * * *